US009086477B2

(12) United States Patent
Fenton (10) Patent No.: US 9,086,477 B2
(45) Date of Patent: *Jul. 21, 2015

(54) ANTI-JAMMING SUBSYSTEM EMPLOYING AN ANTENNA ARRAY WITH A HORIZONTAL CIRCULAR RECEPTION PATTERN (75) Inventor: Patrick C. Fenton, Calgary (CA)

(73) Assignee: NovAtel Inc., Calgary (CA)

( * ) Notice: Subject to any disclaimer, the term of this patent is extended or adjusted under 35 U.S.C. 154(b) by 375 days.

This patent is subject to a terminal disclaimer.

(21) Appl. No.: 13/489,801

(22) Filed: Jun. 6, 2012

(65) Prior Publication Data

US 2013/0328711 A1    Dec. 12, 2013

(51) Int. Cl.
  G01S 7/36      (2006.01)
  G01S 19/21     (2010.01)
  H01Q 17/00     (2006.01)
  H04K 3/00      (2006.01)

(52) U.S. Cl.
  CPC ............. G01S 19/21 (2013.01); H01Q 17/008 (2013.01); H04K 3/228 (2013.01); H04K 3/90 (2013.01); H04K 2203/32 (2013.01)

(58) Field of Classification Search
  CPC ..... H04K 3/228; H04K 3/90; H04K 2203/32; H04K 3/224; G01S 19/36; G01S 7/36
  USPC ........................ 342/16, 17, 359, 384; 375/346
  See application file for complete search history.

(56) References Cited

U.S. PATENT DOCUMENTS

| 5,410,750 | A  |      | 4/1995  | Cantwell et al. |
| 5,534,882 | A  |      | 7/1996  | Lopez |
| 5,818,389 | A  |      | 10/1998 | Lazar |
| 5,831,577 | A  |      | 11/1998 | Nichols et al. |
| 6,023,245 | A  |      | 2/2000  | Gomez et al. |
| 6,091,358 | A  |      | 7/2000  | Maniscalco et al. |
| 6,175,327 | B1 |      | 1/2001  | Lin et al. |
| 6,388,610 | B1 |      | 5/2002  | Przyjemski et al. |
| 6,421,000 | B1 |      | 7/2002  | McDowell |
| 6,445,354 | B1 |      | 9/2002  | Kunysz |
| 6,452,560 | B2 |      | 9/2002  | Kunysz |
| 6,590,528 | B1 | *    | 7/2003  | DeWulf ................... 342/357.63 |
| 6,819,295 | B1 |      | 11/2004 | Peng et al. |

(Continued)

OTHER PUBLICATIONS

Van Veen, B. "Beamforming: A Versatile Approach to Spatial Filtering", IEEE ASSP Magazine Apr. 1988, pp. 4-24.

Primary Examiner — Timothy A Brainard
(74) Attorney, Agent, or Firm — Cesari and McKenna, LLP; Patricia A. Sheehan (57) ABSTRACT An anti-jamming subsystem for jamming signals originating along the horizon includes a two-dimensional horizontal array of antennas that effectively has a horizontal circular reception pattern for receiving signals originating along the horizon and a antenna that has a half hemispherical reception pattern and an upward looking view of the sky. The subsystem utilizes associated phase information to actively combine the signals received by the respective antennas in the array, to produce one or more anti-jamming signals with narrow beams in the directions of the jammers. The subsystem combines the anti-jamming signals with the signals received by the reference antenna, to produce signals for further processing in which the interference from the jamming signals originating along the horizon is minimized without adversely affecting the signals received by the reference antenna from at least higher elevation satellites.

20 Claims, 4 Drawing Sheets (56) References Cited

U.S. PATENT DOCUMENTS

| | | |
|---|---|---|
| 7,009,557 B2 | 3/2006 | Kirchofer et al. |
| 7,068,233 B2 | 6/2006 | Thornberg et al. |
| 7,417,597 B1 | 8/2008 | Lopez |
| 7,450,082 B1 | 11/2008 | Lopez |
| 8,049,667 B2 | 11/2011 | Lackey |
| 8,294,613 B2 | 10/2012 | Stucki |
| 2002/0033766 A1 | 3/2002 | Pratt |
| 2013/0328711 A1 | 12/2013 | Fenton |

* cited by examiner

ANTI-JAMMING SUBSYSTEM EMPLOYING AN ANTENNA ARRAY WITH A HORIZONTAL CIRCULAR RECEPTION PATTERN

BACKGROUND OF THE INVENTION

1. Field of the Invention

The invention relates generally to anti-jamming systems for use with satellite system antennas and, in particular, to anti-jamming systems that are associated with jamming signals that originate along the horizon.

2. Background Information

Global navigation satellite systems (GNSS) provide ranging signals that are utilized in applications that determine global positions of delivery trucks, position information for arriving or departing aircraft, global positions of cellular phones for use by social media and also for emergency 911 purposes, and so forth. As is well known, GNSS antennas receive signals from a plurality of GNSS satellites and associated GNSS receivers determine positions based on the timing of codes and carriers in the received GNSS satellite signals. Increasingly, portable jammers are employed to disrupt particular position calculation operations.

The jammers emit signals at the frequencies of the GNSS satellite signals. The jammer signals that are received by the GNSS antenna interfere with the GNSS satellite signals received by the GNSS antenna and effectively prevent a GNSS receiver from determining an accurate position based on the received GNSS satellite signals. A local jammer may be used, for example, on a delivery truck, to provide jamming signals to the GNSS antenna located on the truck, and thus, prevent the associated GNSS receiver from calculating accurate positions, when the driver wishes to drive the truck on an unauthorized route or at an unauthorized time.

Unfortunately, the signals emitted by a local jammer not only interfere with the GNSS signals received by the co-located GNSS antenna, in the example, the GNSS antenna on the truck, the jammer signals also interfere with the GNSS satellite signals received by nearby GNSS antennas, that is, GNSS antennas that are located within one or two miles of the jammer. Accordingly, as the truck travels along its unauthorized route, the on-board jammer may inadvertently disrupt the operations of various GNSS receivers that provide vital emergency 911 position information, aircraft landing and departing position information, and so forth.

The portable jammers emit jamming signals that have the same frequencies as the GNSS satellite signals and have, at the nearby GNSS antennas, higher power than the GNSS satellite signals which are received after travelling much longer distances through the atmosphere. Thus, the jamming signals overwhelm the GNSS satellite signals at the nearby GNSS antennas, and the GNSS receivers cannot then determine the code and carrier timing needed for position calculations.

The jamming emissions from the jammers of interest can be considered as originating along the horizon. The azimuth angles of the jammer emissions at the nearby GNSS antennas are thus similar to the azimuth angles of signals arriving from low-elevation GNSS satellites that are rising above the horizon and into the sky view of the GNSS antennas. The signals from the low-elevation GNSS satellites may be required for the position calculations, and thus, it is desirable to receive the GNSS satellite signals from the low-elevation GNSS satellites. However, it is not desirable to suffer the adverse effects of interference associated with jamming emissions originating from jammers along the horizon.

What is needed is an anti-jamming mechanism that addresses the adverse effects of the jamming emissions originating along the horizon in the received signals, while at the same time preserving for use in position calculations the received GNSS satellite signals from the higher elevation GNSS satellites as well as the low-elevation satellites that are not in the same directions as the jammers.

SUMMARY OF THE INVENTION

An anti-jamming subsystem that is directed to jamming signals originating along the horizon includes a two-dimensional horizontal array of antennas that effectively has a horizontal circular reception pattern for receiving signals originating along the horizon. The subsystem connects on the RF signal path from a reference antenna, which has a half hemispherical reception pattern that is positioned to have an upward looking view of the sky, for example, a reference GNSS antenna. The subsystem utilizes associated phase information to actively combine the signals received by the respective antennas in the array, to produce one or more anti-jamming signals with narrow beams in the directions, i.e., the incident azimuth angles, of the jamming signals originating along the horizon. The subsystem then combines the anti-jamming signals with the signals received by the reference antenna, to produce signals for further processing in which the interference from the jamming signals originating along the horizon is substantially reduced or cancelled and in which the signal characteristics of the signals received by the reference antenna from at least higher elevation satellites are not adversely affected. The signals for further processing thus correspond to a combined antenna reception pattern which has horizontal nulls in the directions of the jammers along the horizon and preserves the phase and timing information of signals originating from higher elevation transmitters.

BRIEF DESCRIPTION OF THE DRAWINGS

The invention description below refers to the accompanying drawings, of which.

DETAILED DESCRIPTION OF AN ILLUSTRATIVE EMBODIMENT

The anti-jamming subsystem is described as operating with a conventional GNSS antenna as the reference antenna. However, the invention may be used with reference antennas utilized in other satellite systems and/or systems utilizing relatively high elevation signal transmitters.

Figure 1:
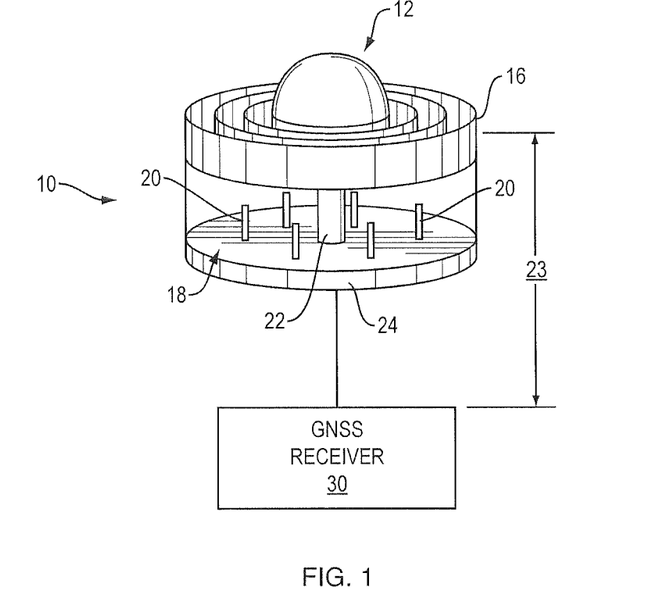
FIG. 1 is a schematic diagram of a system that utilizes an anti-jamming subsystem constructed in accordance with the invention.
Figure 2:
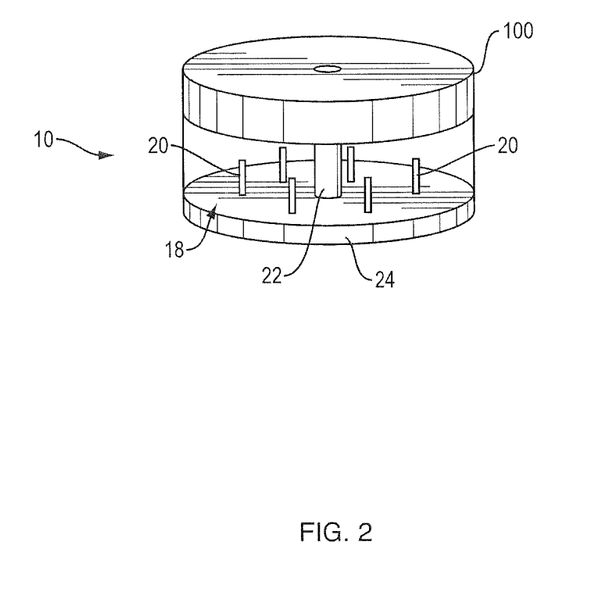
FIG. 2 illustrates the anti-jamming subsystem of FIG. 1 in more detail.

Referring now to FIGS. 1 and 2, an anti-jamming subsystem 10 connects electrically in an RF signal path 23 from a high precision GNSS antenna 12, referred to herein as "the reference antenna 12," which, as is conventional, has a half hemispherical radiation pattern and is positioned to have an upward looking view of the sky. As shown, the subsystem 10 connects to the RF path between the reference antenna and a GNSS receiver 30.

The subsystem 10 includes an array 18 of antennas 20 that effectively has a horizontal circular reception pattern for receiving signals originating along the horizon. As shown, the subsystem 10 is placed below and in close proximity to the reference GNSS antenna 12. Accordingly, signals in a vertical direction are prevented from reaching the antennas 20 by a ground plane 14 of the reference antenna 12. The reference antenna 12 may also include a choke ring 16, which operates in a known manner to minimize the reception by the antenna 12 of signals reflected from the ground. In the example, the antennas 20 are dipole antennas and the reference antenna 12 is a geodetic antenna.

As discussed in more detail below, electronics 24 in the anti-jamming subsystem 10 actively combines the signals received by the antennas 20 to produce one or more anti-jamming signals that have opposite phases and the same magnitudes as the jamming signals received by the reference antenna 12 that originated along the horizon. The electronics 24 further combines the anti-jamming signals with the signals received by the reference antenna 12, to produce signals for further processing in which the interference from the jammer emissions that originate along the horizon is significantly reduced, i.e., minimized or cancelled.

More specifically, the electronics actively combines the signals from the antennas in the array to produce narrow beams in the directions, i.e., incident azimuth angles, of the respective jammers originating along the horizon. When the anti-jamming signals are, in turn, combined or mixed with the signals received by the reference antenna, horizontal nulls are formed in a combined antenna reception pattern in the directions of the jammers along the horizon, while the signals received by the reference antenna from the higher elevation GNSS satellites and the low-elevation GNSS satellites that arrive at azimuth angles other than the azimuth angles of the jammer emissions are otherwise unaffected by the anti-jamming signals. Accordingly, when the resulting signals for further processing are provided to the GNSS receiver 30, the receiver processes the signals in a conventional manner to determine satellite signal phase and timing information.

The anti-jamming subsystem 10 may include a metal top 100, which allows the subsystem to be placed either directly underneath the ground plane 14 of the reference antenna 12 such that the ground plane 14 prevents signals arriving vertically from reaching the antennas 20, or in close proximity to the reference antenna such that the top 100 prevents the signals arriving vertically from reaching the antennas 20. The subsystem 10 may but need not also be positioned relative to the reference antenna 12 such that the phase center of the antenna array 18 aligns with the phase center of the reference antenna.

The subsystem 10 thus produces one or more anti-jamming signals that combine or mix with the signals received by the reference antenna 12, to eliminate the interference from jammers along the horizon while also preserving attributes of interest in the received GNSS satellite signals. Accordingly the carrier-to-noise ratios, the phase center offsets and the phase center variations associated with at least the higher elevation GNSS satellite signals are not significantly affected in the resulting signals for further processing. Notably, the signals for further processing also include low-elevation GNSS satellites signals that are received at the antenna 12 at incident azimuth angles that differ from the incident azimuth angles of the jammer emissions.

Referring still to FIGS. 1 and 2, the signals received by the reference antenna 12 are fed to the subsystem electronics 24 through a feed line 22 that isolates the signals from the antennas 20. The signals from the respective antennas 20 in the antenna array 18 are also provided to the electronics 24.

Figure 3:
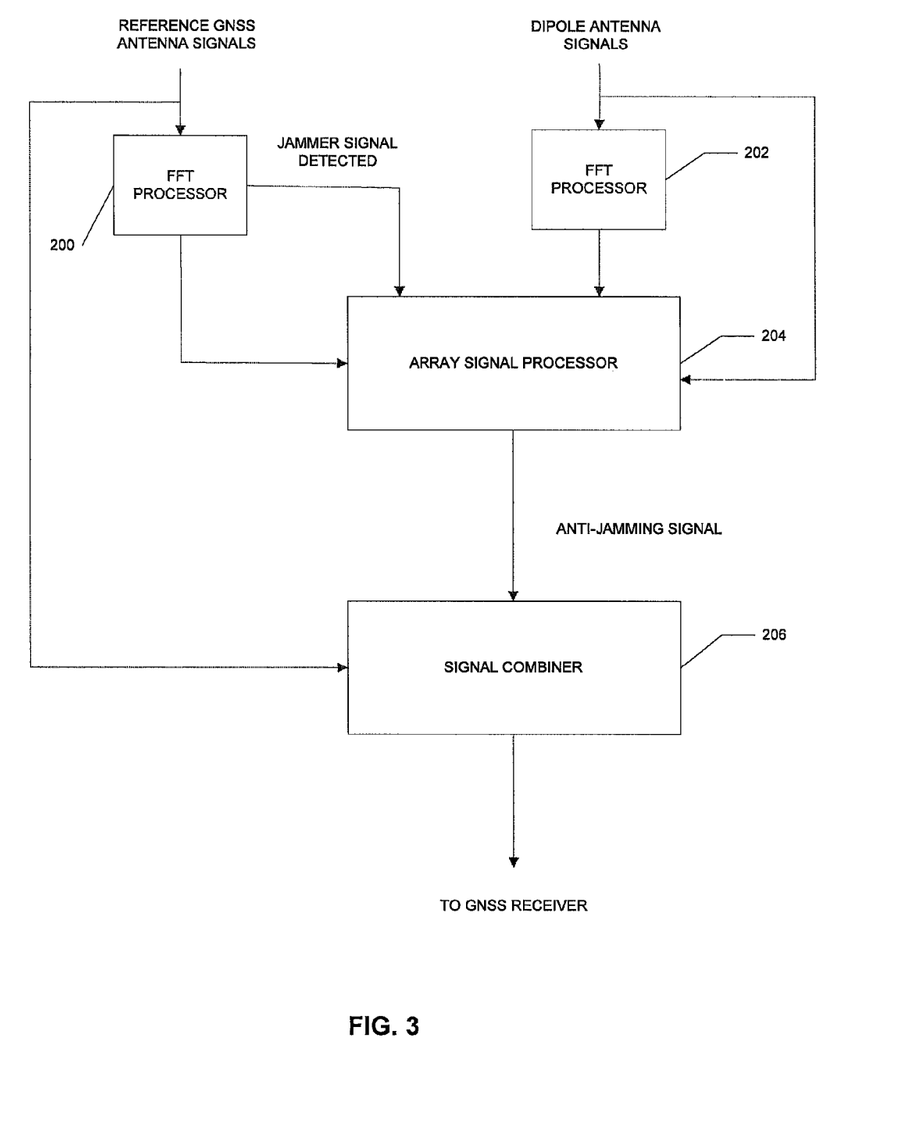
FIG. 3 illustrates electronics of the anti-jamming subsystem of FIG. 1 in more detail.

Referring now also to FIG. 3, the signals received by the reference antenna 12 and the antennas 20 are provided, respectively, to FFT processors 200 and 202. The processors operate in a known manner to perform FFTs on the received signals. The antennas 20 each receive the one or more jamming signals at different phase angles, due to relative positions of the antennas in the array 18, and the phase information is provided by the FFT processing.

An array signal processor 204, operating in a known manner, utilizes the phase information to actively combine the signals from the antennas 20, to produce anti-jamming signals that have opposite phases and the same magnitude as the jamming signals received by the reference antenna 12 that originated along the horizon. The array signal processor thus phase shifts and associates gains with the signals from the respective antennas 20 and combines the signals to produce the anti-jamming signals. The array signal processor 204 also operating in a known manner adjusts the amplitude of the anti-jamming signals, to essentially match the power levels of the one or more jamming signals in the signals received by the reference antenna 12, based on the results of the FFT processing of the signals received by the reference antenna 12.

A signal combiner, or mixer, 206 combines the anti-jamming signals with the signals received by the reference antenna 12, to produce the signal for further processing that is then provided to the receiver 30. When the anti-jamming signals and the signals received by the reference antenna 12 are combined, the interference from the jammer emissions is effectively removed, i.e., substantially reduced or cancelled, and the signals from at least the higher elevation GNSS satellites are not otherwise affected.

The array signal processor 204 may perform a least squares analysis in a known manner, to determine the appropriate phase shifts and gains to apply to the signals received by the respective antennas 20. The processor produces anti-jamming signals with narrow beams in the directions of the jammers along the horizon, to essentially isolate and amplify the jamming signals from other nearby signals and noise from other directions. The processor thus combines the signals from the antennas 20 in the array 18 using techniques employed by known multiple side lobe cancellers. However, the known side lobe cancellers operate with multiple antennas that all have essentially the same reception patterns, such that the multiple antennas all "see" the same signals. Using the subsystem 10, the array 18 of antennas 20 is configured specifically to have a reception pattern that is separated from the reception pattern of the reference antenna 12. With the separation in the reception patterns, the processor can produce narrow beams that eliminate or minimize the interference from the jammer emissions originating along the horizon when the anti-jamming signals are combined with the signals received by the reference antenna; while also preserving the signal characteristics, i.e., phase and timing content, of the signals received by the reference antenna 12 from higher elevation angles that are outside of the constrained horizontal circular reception pattern of the antennas 20 in the array 18.

In an alternative embodiment of the anti-jamming subsystem, the electronics 24 performs additional processing to determine if jamming signals are present and received also by the antennas 20 in the array. The subsystem then produces the anti-jamming signals and/or combines the anti-jamming signals with the signals received by the reference antenna only if the jamming signals are detected in the signals received by both the reference antenna 12 and the antennas 20 in the array 18. In this way, the subsystem does not needlessly add noise into the satellite signals received by the reference antenna when the jamming signals are absent.

The FFT processor 200 determines that one or more jamming signals are present if one or more frequency components of the signals received by the reference antenna have power above a predetermined threshold. When the FFT processor 200 detects one or more jamming signals in the signals received by the reference antenna 12, the FFT processor 202 determines if the antennas 20 are also receiving one or more of the jamming signals. The FFT processor 202 thus determines if the respective antennas 20 have received signals with the same frequency components as the one or more detected jamming signals. If so, the FFT processor 202 directs the array signal processor 204 to produce the anti-jamming signals and/or the signal combiner 206 to mix the anti-jamming signals with the signals received by the reference antenna 12.

Figure 4:
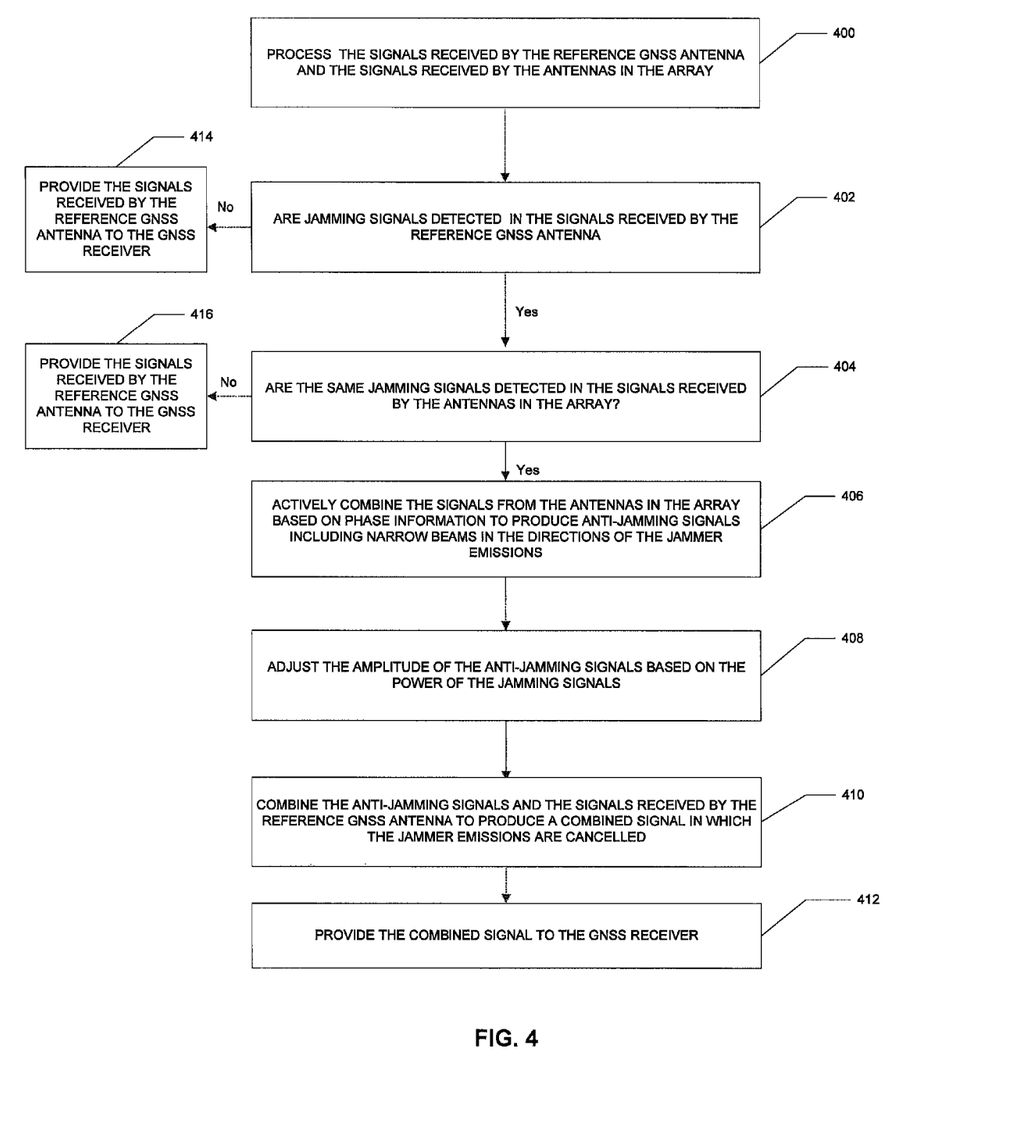
FIG. 4 is a flow chart of the operations of the anti-jamming subsystem of FIG. 1.

Referring now to FIG. 4, the operations of the electronics 24 to detect jamming signals and remove the interference associated with the jamming signals originating along the horizon will be described in more detail. Signals received from the GNSS reference antenna 12 are processed to determine if there are higher power frequency components (Step 400). In the example, the signals are applied to the FFT processor 200, which performs a conventional FFT and detects spikes in the frequency bins to determine the presence of one or more jamming signals (Step 402).

If jamming signals are detected, that is, in the example, if the spikes are detected in one or more frequency bins, the subsystem determines if the same one or more jamming signals are present in the signals received by the antennas 20 in the array 18 (Step 404). Thus, the FFT processor 202 determines whether or not the antennas 20 have also received the one or more jamming signals by checking for spikes in the corresponding frequency bins.

If one or more signals having essentially the same frequency components as the one or more jamming signals are detected in the signals received by the antennas 20, the array signal processor 204 utilizes the associated phase information to produce the anti-jamming signals that have opposite phases and the same magnitudes as the jamming signals detected within the reference antenna's signal and originating along the horizon (Step 406). The array signal processor 204 thus appropriately phase shifts and assigns gains to the signals received by the respective antennas 20 and combines the signals, to form one or more anti-jamming signals. As discussed, the array signal processor 204 may perform a least squares analysis to determine the appropriate phase shifts and gains using known side lobe cancellation techniques.

In step 408, the array signal processor 204, also in a known manner, adjusts the amplitude of the one or more anti-jamming signals, to essentially match the power levels of the corresponding one or more jamming signals in the signals received by the reference antenna 12. In step 410, a combining circuit 206 combines, or mixes, the one or more anti-jamming signals and the signals received by the reference antenna 12 and produces the signals for further processing in which the interference from the jammer emissions originating along the horizon are effectively eliminated and the signal characteristics of signals received from at least the higher elevation GNSS satellites are preserved. In step 412, the resulting signals for further processing are provided to the GNSS receiver 30, which operates in a known manner to determine satellite signal phase and timing information.

If no jamming signals are detected in the signals received by the reference antenna 12, the subsystem 10 provides the signals received by the referenced GNSS antenna to the GNSS receiver 30 without combining them with signals produced by the array signal processor 204 (Step 414). Similarly, if a jamming signal is detected in the signals received by the reference antenna 12, but the same signal is not detected in the signals received by the respective antennas 20, as would be the case if the jamming source originated from a high elevation angle, the signals received by the referenced GNSS antenna are provided to the GNSS receiver 30 without combining them with signals produced by the array signal processor (Step 416).

The GNSS receiver 30, which receives either the resulting signals for further processing or the signals received by the reference antenna, operates in a known manner to determine satellite signal phase and timing information. If jammer emissions from jammers that are located at elevations above the horizon are included in the signals provided to the GNSS receiver 30, the receiver may attempt compensation for the associated interference using known signal processing techniques.

Referring again to FIGS. 1 and 2, the anti-jamming subsystem 10 operates to effectively eliminate the interference of jamming signals that originate along the horizon from the signals to be processed by the receiver 30. The anti-jamming subsystem is designed to operate with existing high performance reference antennas 12, by fitting under the existing antenna and/or in close proximity to the reference antenna in the RF signal path between the antenna 12 and the associated GNSS receiver 30. Notably, no changes are required to be made to the reference GNSS antenna 12. Alternatively, the anti-jamming subsystem could be integrated into a GNSS antenna.

The high performance reference antenna 12 may be, for example, a patch antenna, a pinwheel antenna, or other geodetic antenna. The antennas 20 in the array 18 may be dipole, helical or patch antennas. The antennas 20 are positioned between top and bottom horizontal ground planes. The bottom horizontal ground plane is the ground plane of the array and the top horizontal ground plane may be the ground plane 14 of the reference antenna 12 or a ground plane formed by the top 100 of the subsystem structure. The subsystem thus operates with an array that has a horizontal circular reception pattern that is constrained to receiving only signals originating along the horizon. The anti-jamming subsystem 10 may be filled, essentially between the top 100 of the subsystem and the ground plane of the array, with an RF transparent material, such as, for example, Teflon. Alternatively, the subsystem 10 may be constructed with sealed RF transparent walls and a metal top 100, such that the subsystem can be mounted directly to the bottom of or closely below the ground plane 14 of the reference antenna 12.

The subsystem 10 may be mounted such that the respective antennas 20 are less than one wavelength from the phase center of the reference antennas 12. Alternatively, the array may be constructed with and compensate for larger offsets. Further, as discussed, the array may be positioned such that the phase center of the array is aligned with the phase center of the reference antenna. While an array 18 of six antennas 20 is illustrated in FIG. 1, the array may instead consist of fewer or more antennas arranged in a horizontal two-dimensional pattern. If the array 18 and the electronics 24 are not co-located, the array 18 may but need not be positioned in the RF signal path between the reference antenna 12 and the receiver 30, as long as the array is in close proximity to the reference antenna. The electronics 24, however, must receive signals from both the reference antenna 12 and the antennas 20 in the array 18, in order to provide the corresponding signals for further processing to the receiver 30.

While the interference associated with jammer emissions from jammers along the horizon is essentially eliminated as described above, GNSS signals reflected off of the ground and received by the antennas 20 may be added into the GNSS signals received by the reference antenna 12 when the received signals and the anti-jamming signal are combined. Accordingly, some additional GNSS multipath interference may have to be handled by the GNSS receiver 30. However, only the reflected signals received from the directions of the jammer emissions are included in the combined signal in this manner. Also, the contributions of signals received from low elevation GNSS satellites in the same directions as the jammer emissions may be adversely affected by the anti-jamming signals. However, the signals from other low-elevation GNSS satellites are not adversely affected.

While various processors are discussed, the operations may be performed by a single processor, by fewer processors or by more processors. The processors that are described as performing FFTs may instead perform other known processes for determining the presence of the one or more jamming signals in the signals received by the GNSS reference antenna and the signals received by the respective antennas in the array. The processors that are described as performing a least squares analysis may instead perform other known processes to determine the appropriate phase shifts and gains to apply to the signals received by the respective antennas in the array. The processors may, for example, utilize known reference signal techniques, known linearly constrained minimum variance beamforming techniques, or other known techniques associated with statistically optimum beamforming.

What is claimed is:

1. An anti-jamming subsystem comprising:
   a. a horizontal two-dimensional array of antennas configured to have a horizontal circular reception pattern and receive signals originating along the horizon and to be positioned in close proximity to a reference antenna having a half hemispherical reception pattern and positioned to have an upward looking view of the sky;
   b. one or more processors that are configured to process signals received by the reference antenna and the signals received by the respective antennas in the array and actively combine the signals received by the respective antennas in the array to produce one or more anti-jamming signals that combine with the signals received by the reference antenna to substantially cancel interference from jamming signals originating along the horizon and preserve phase and timing information in signals originating from higher elevation transmitters.

2. The anti-jamming subsystem of claim 1 further includes a top that prevents signals arriving vertically from reaching the array of antennas.

3. The anti-jamming subsystem of claim 1 wherein the array of antennas is positioned relative to a ground plane of the reference antenna such that the ground plane prevents signals arriving vertically from reaching the array of antennas.

4. The anti-jamming subsystem of claim 1 wherein the array of antennas is positioned relative to the reference antenna to operate with the same phase center as the reference antenna.

5. The anti-jamming subsystem of claim 1 wherein the one or more processors perform Fast Fourier Transforms (FFTs) of the signals received by the reference antenna and the antennas in the array to determine phase shifts and gains to apply to the signals received by the respective antennas in the array to produce the one or more anti-jamming signals.

6. The anti-jamming subsystem of claim 5 wherein the one or more processors determine if jamming signals are present.

7. The anti-jamming subsystem of claim 5 wherein the one or more processors use power information from the FFT processing to adjust the amplitude of the anti-jamming signal.

8. The anti-jamming subsystem of claim 1 wherein the one or more processors
   combine the anti-jamming signals with the signals received by the reference antenna to produce signals for further processing in which the jamming signals originating along the horizon are effectively cancelled and phase and timing information from signals received from transmitters above the horizon are preserved, and
   provide the signals for further processing to a receiver.

9. The anti-jamming subsystem of claim 8 wherein the array and the one or more processors are co-located in an RF signal path between the reference antenna and the receiver.

10. The anti-jamming subsystem of claim 1 wherein the antennas in the array are dipole antennas, helical antennas or patch antennas.

11. The anti-jamming subsystem of claim 1 wherein the antennas in the array are positioned between top and bottom horizontal ground planes.

12. The anti-jamming subsystem of claim 11 wherein one or both of the ground planes are provided within the subsystem.

13. The anti-jamming subsystem of claim 11 wherein the top ground plane is a ground plane of the reference antenna.

14. A method of producing signals with reduced interference from jamming signals originating along the horizon comprising:
   a. receiving satellite signals using a reference antenna that has a half hemispherical reception pattern and is positioned to have an upward looking view of the sky;
   b. receiving one or more jamming signals originating along the horizon using an array of antennas configured to have a horizontal circular reception pattern and constrained to receive signals originating along the horizon;
   c. processing the signals received by the reference antenna and the array of antennas to produce one or more anti-jamming signals that have opposite phases and the same magnitudes as the one or more jamming signals originating along the horizon; and
   d. combining the anti-jamming signals with the signals received by the reference antenna to produce signals in which interference from the jamming signals originating along the horizon is effectively eliminated and phase and timing information of signals originating from higher elevation satellites are preserved.

15. The method of claim 14 wherein the processing of the signals includes performing a least squares analysis to determine phase shifts and gains to apply to the signals received by the antennas in the array to produce anti-jamming signals with narrow beams in the directions of the jammers along the horizon.

16. The method of claim 15 wherein the processing of the signals includes determining if the same jamming signals are present in the signals received by the reference antenna and the antennas in the array.

17. The method of claim 16 wherein the processing of signals includes performing FFTs and determining if there are spikes in one or more corresponding frequency bins.

18. The method of claim 17 wherein the combining of the signals received by the antennas in the array includes using phase information from the FFT processing to actively combine the signals received by the antennas in the array.

19. The method of claim 18 wherein the combining of the signals further includes performing a least squares analysis to determine the phase shifts and gains.

20. A system for removing interference from jamming signals:
- a reference antenna with a half hemispherical reception pattern and positioned with an upward looking view of the sky;
- an array of antennas with a horizontal circular reception pattern that is constrained to receive signals originating along the horizon;
- one or more processors configured for processing the signals received by the reference antenna and the antennas in the array and actively combining the signals received by the antennas in the array to produce anti-jamming signals having opposite phases and the same magnitudes as jamming signals originating along the horizon; and
- one or more processors for combining the anti-jamming signals with the signals received by the reference antenna to produce combined signals in which interference from the jamming signals originating along the horizon is substantially reduced and the phase and timing information for signals received from higher elevation transmitters are preserved.

* * * * *